United States Patent
Van Beek et al.

(10) Patent No.: US 7,511,812 B2
(45) Date of Patent: Mar. 31, 2009

(54) ABERRATION CORRECTION FOR SPECTROSCOPIC ANALYSIS

(75) Inventors: Michael Cornelis Van Beek, Eindhoven (NL); Wouter Rensen, Eindhoven (NL); Gerald Lucassen, Eindhoven (NL); Marjolein Van Der Voort, Valkenswaard (NL); Bernardus Leonardus Gerardus Bakker, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 101 days.

(21) Appl. No.: 11/570,133

(22) PCT Filed: Jun. 13, 2005

(86) PCT No.: PCT/IB2005/051944

§ 371 (c)(1),
(2), (4) Date: Dec. 7, 2006

(87) PCT Pub. No.: WO2006/000939

PCT Pub. Date: Jan. 5, 2006

(65) Prior Publication Data

US 2008/0002199 A1    Jan. 3, 2008

(30) Foreign Application Priority Data

Jun. 21, 2004 (EP) ................... 04102841

(51) Int. Cl.
*G01J 3/30* (2006.01)
(52) U.S. Cl. ..................... 356/317
(58) Field of Classification Search ............ 356/317
See application file for complete search history.

(56) References Cited

U.S. PATENT DOCUMENTS

| 4,835,561 A * | 5/1989 | Matsui ................. 396/104 |
| 5,452,085 A * | 9/1995 | Fancy et al. ............ 356/326 |
| 5,847,400 A * | 12/1998 | Kain et al. ............ 250/458.1 |
| 6,609,015 B2 | 8/2003 | Lucassen et al. |
| 6,693,742 B1 | 2/2004 | Winterot et al. |
| 2003/0091221 A1* | 5/2003 | Marcelpoil et al. ......... 382/128 |
| 2004/0207841 A1 | 10/2004 | Yoshida |
| 2004/0247201 A1* | 12/2004 | Arazaki ................. 382/275 |

FOREIGN PATENT DOCUMENTS

| DE | 102 28 477 A1 | 1/2004 |
| WO | 2002057758 A1 | 7/2002 |
| WO | 2002057759 A1 | 7/2002 |
| WO | 2004048908 A2 | 6/2004 |
| WO | 2004082474 A1 | 9/2004 |
| WO | 2005015179 A1 | 2/2005 |

* cited by examiner

Primary Examiner—Kara E Geisel

(57) ABSTRACT

A spectroscopic system which determines a property of a biological structure in a volume of interest of a person includes a low cost objective lens for directing an excitation beam into a volume of interest and for collecting return radiation from the volume of interest. After detection of the return radiation and generation of spectroscopic signals, a correction unit performs a compensation for aberrations of the spectroscopic signals introduced by the low cost objective lens. Since the aberrations of the objective lens strongly depend on the lateral distance of the volume of interest from the optical axis of the objective lens, the correction unit uses a correction table providing an assignment between correction values and various lateral positions of the volume of interest.

14 Claims, 3 Drawing Sheets

ABERRATION CORRECTION FOR SPECTROSCOPIC ANALYSIS

The present invention relates to the field of spectroscopic analysis of a volume of interest.

Usage of optical spectroscopy techniques for analytical purposes is as such known from the prior art. U.S. Pat. Nos. 6,609,015 and 6,687,520 show spectroscopic analysis apparatuses for in vivo non-invasive spectroscopic analysis of the composition of blood flowing through a capillary vessel of a person. Preferably, spectroscopic analysis is realized by making use of confocal Raman spectroscopy to measure the concentration of analytes in blood in vivo which allows for non-invasive blood analysis (NIBA).

For acquiring a high signal to noise ratio or signal to background ratio of a detectable spectroscopic signal it is advantageous, that a confocal measurement volume is completely located inside a blood vessel. On the one hand, this requires a precise determination of the location of a blood vessel underneath the surface of the skin of the person. On the other hand, the confocal measurement volume of the spectroscopic system has to be accurately shifted to the determined location of the blood vessel.

For most applications of a non-invasive blood analysis system, it is advantageous when the system is separated into two components, namely a base station and a flexible probe head that are connected by an optical fiber. The larger base station typically contains the rather spacious excitation laser and spectroscopic analysis means and the relatively small and flexible probe head provides optical components that are necessary for directing an excitation beam into a volume of interest and for collecting spectroscopic data.

A small and flexible probe head is particularly advantageous when those parts of a body should become subject to analysis that are difficult to access, like ear lobes, lips, tongue, nostrils, or skin flaps between fingers. Therefore, its overall size is one of the most important design criteria of a probe head. Additional to the size requirement the probe head should feature low weight allowing for a maximum of person comfort and accessibility.

However, the probe head has to provide an effective means for directing the confocal measurement volume into a distinct volume of interest underneath the surface of the skin. Principally, there exist three different approaches for shifting the confocal measurement volume into a desired location. First, the objective lens and the confocal measurement volume are fixed with respect to each other, i.e. the position of the focal spot of the objective lens cannot be shifted with respect to the lens. In this first approach, the optical components of the probe head are preferably arranged in such a way to support paraxial propagation of the relevant optical signals. Shifting of the confocal measurement volume into a volume of interest of the skin can be effectively realized by shifting the skin with respect to the probe head and the optical means.

The second approach makes use of fixing the skin with respect to the probe head. The confocal measurement volume is also fixed with respect to the position of the objective lens. In this case, the required shifting between the confocal measurement volume and the volume of interest can be realized by shifting the entire optical arrangement or at least a part of the optical arrangement with respect to the probe head itself. For example, the housing of the probe head is rigidly attached to the surface of the skin and the optical means of the probe head are allowed to perform an e.g. lateral movement with respect to the housing of the probe head. The expression lateral refers to the plane being substantially perpendicular to the optical axis of the objective of the probe head.

The third approach for shifting the confocal measurement volume with respect to the skin is based on rigidly fixing the probe head and the objective to the skin but allowing to laterally shift the confocal measurement volume with respect to the objective. This implies, that the angle of incidence of the optical signals (excitation beam and detected signal beam) and the objective has to be modified.

The first and the second approach have the advantage that the measurement volume is located on the optical axis allowing for a straightforward optical implementation but requiring rather sophisticated mechanical means. The third approach makes use of shifting the confocal measurement volume off optical axis and does therefore only require basic mechanical components, such as e.g. a rotatable or steerable mirror. Making use of this approach induces inevitable aberrations of the objective lens since the relevant spectroscopic signals emanating from the measurement volume propagate at a non-zero angle with respect to the optical axis of the objective lens. Consequently, the acquired spectral data are influenced in several ways.

For example chromatic aberrations can cause broader lines in the spectrum and various wavelength might be detected with a different efficiency. Therefore, probe heads making use of shifting the confocal measurement volume with respect to the lens by non-paraxial propagation of the optical signals generally require a complex objective lens with an extremely low degree of aberrations. Such complex objective lenses are very expensive and therefore inadequate for implementation into low cost probe heads for e.g. a non-invasive blood analysis system.

The present invention therefore aims to provide an improved optical system allowing for the implementation of inexpensive optical components for spectroscopic systems for determining a property of a biological structure in a volume of interest underneath the surface of the skin of a person.

The invention provides a spectroscopic system for determining a property of a biological structure in a volume of interest of a person. The spectroscopic system comprises an objective lens for directing an excitation beam into the volume of interest and for collecting return radiation from the volume of interest. The spectroscopic system further comprises a detector for detecting return radiation from the volume of interest and a correction unit for correcting aberrations of the objective lens.

Typically, the volume of interest refers to a volume underneath the surface of the skin of a person that defines a location of a particular biological structure or tissue such as e.g. blood vessels. Preferably, blood flowing through such a blood vessel becomes subject to spectroscopic analysis. In this way a non-invasive blood analysis (NIBA) can be sufficiently performed.

Preferably, the spectroscopic system comprises a base station and a flexible probe head featuring a compact design. The objective lens of the probe head is preferably implemented as a low cost optical component inevitably featuring appreciable aberrations. Making use of a correction unit allows for correcting and compensating aberrations that are due to the imperfect objective lens. Therefore, the invention provides an effective approach to implement a low cost objective lens for spectroscopic data acquisition at the expense of appreciable aberrations. By successively compensating these aberrations, the disadvantages of such a low cost optical lens can be effectively eliminated, thus allowing an implementation of such a low cost objective lens into a high precision measurement device, such as a NIBA spectroscopic system.

The correction unit is further adapted to compensate for a plurality of different types of aberrations. The correction unit is preferably adapted to compensate for chromatic aberrations as well as monochromatic aberrations. Referring to monochromatic aberrations, the correction unit is well suited to compensate effects of astigmatism, field curvature, coma, spherical aberration and distortion such as pin cushion distortion or barrel distortion.

Preferably, the spectroscopic data is obtained in response of strongly focusing the excitation beam in a designated volume of interest. In response of this kind of excitation, the spectroscopic signals, i.e. scattered radiation, emanates from the volume of interest and is detected by a detector. For determination of the composition of the volume of interest, the spectroscopic analysis of the acquired data is of interest. In other words, the relative intensities of the various frequency components of the obtained spectrum are indicative of the composition of the volume of interest.

Due to chromatic aberrations of the objective lens, characteristic lines in the spectrum can become broader and/or the intensity of various wavelength of the spectrum can be altered. Therefore, the correction unit is adapted to compensate for chromatic aberrations critically influencing the acquired spectral information.

According to a further preferred embodiment of the invention, the spectroscopic system further comprises a rotatable mirror element for positioning of a confocal measurement volume of the objective lens into the volume of interest. The rotatable mirror element is further adapted to laterally shift the confocal measurement volume with respect to the optical axis of the objective lens.

By laterally shifting of the confocal measurement volume, the rays of the excitation beam and the return radiation emanating from the volume of interest propagate in a non-parallel way with respect to the optical axis of the objective lens and/or with respect to the optical axis of the entire optical system of the spectroscopic system or the probe head.

In this way, the inventive spectroscopic system allows for changing the propagation angle of the excitation beam and detected return radiation with respect to the optical axis of the objective lens.

Preferably, the rotatable mirror element is implemented into the probe head of the spectroscopic system allowing for a rather robust, inexpensive, and effective mechanical as well as optical design of the probe head. Making use of the rotatable mirror element for realizing of a non-paraxial and/or off-optical axis arrangement for the excitation radiation and the return radiation critically enhances the influence of the aberrations of the objective lens on the obtained spectroscopic data.

Since the aberrations introduced by the objective lens strongly depend on the relative angle between the propagation direction of the return radiation and the optical axis of the objective lens, the correction unit makes effective use of information specifying a propagation angle between the optical rays of either excitation and/or return type and the optical axis of the objective lens.

According to a further preferred embodiment of the invention, the correction unit is adapted to perform a correction of the detected return radiation. In this way, the aberrations of the objective lens are not compensated by optical means but moreover the correction mechanism is applied to signals that are generated upon detection of the spectroscopic signals. Having knowledge of the relative propagation angle between excitation beam and optical axis of the objective, allows to effectively apply a correction of the spectroscopic data by e.g. electrical signal and/or data processing means.

According to a further preferred embodiment of the invention, the correction unit is further adapted to make use of correction values provided by a correction table. Each correction value of the correction table is specific for a lateral distance from the volume of interest to the optical axis of the objective lens. In other words, each correction value is specific for a relative propagation angle between the excitation and/or return radiation and the optical axis of the objective lens. The correction table provides an assignment between lateral distances, i.e. relative propagation angles, and a necessary correction value allowing for a precise compensation of aberrations introduced by the objective lens. Here, a correction value can refer to a scalar value, a correction vector, or even a correction matrix. In this way, a plurality of various aberrations, either of monochromatic or chromatic nature can effectively be compensated.

Preferably, the correction table is obtained by means of a calibration procedure of the entire spectroscopic system. In this case, a reference spectroscopic signal is obtained by acquiring spectroscopic data from the volume of interest being located on the optical axis of the objective lens. By successively laterally shifting the volume of interest and the confocal measurement volume of the spectroscopic system, the same spectroscopic signal is obtained from a plurality of various lateral positions allowing for a comparison with the reference signal.

By comparison of the reference signal with the plurality of spectroscopic signals acquired at various lateral positions allows for characterization of the aberrations of the objective lens and the entire optical arrangement of the spectroscopic probe head.

Furthermore, the correction table is implemented as a two dimensional matrix allowing for a characterization of the aberrations of the objective lens that are due to lateral displacements in both lateral directions of the volume of interest and hence the confocal measurement volume with respect to the optical axis of the objective lens.

According to a further preferred embodiment of the invention, the lateral distance from the volume of interest to the optical axis of the objective is determinable by the orientation of the rotatable mirror element. Preferably, the rotatable mirror element is steerable by some kind of actuator. Having knowledge of the position of the actuator, and hence of the orientation of the rotatable mirror allows to specify the relative propagation angle of the excitation beam with respect to the optical axis of the objective lens. This allows for an intuitive and straightforward access to the parameter that governs aberrations of the objective lens.

According to a further preferred embodiment of the invention, the spectroscopic system further comprises an imaging system providing an image of a region of interest for determining the lateral position of the volume of interest with respect to the optical axis of the objective lens. For example, the imaging system provides an image of the surface of a skin of a person for identifying the position of a particular volume of interest within the surface image of the skin. The imaging system also provides imaging of a region of interest that is located below the surface of the skin of the patient. By means of this imaging referring to a region of interest either on or below the surface of the skin, the measurement volume of the spectroscopic system can be sufficiently shifted in order to overlap with the volume of interest.

Suitable imaging methods include Orthogonal Polarized Spectral Imaging (OPSI), Confocal Video Microscopy (CVM), Optical Coherence Tomography (OCT), Confocal Laser Scanning Microscopy (CLSM), Doppler Based Imaging and ultrasound based imaging. Corresponding imaging techniques are disclosed U.S. 60/262582, U.S. Ser. No.

09/912,127, U.S. Ser. No. 09/912,127, EP03100689.3, EP 03102481.3, the entirety of which is herein incorporated by reference.

Furthermore, determining the lateral position of the volume of interest with respect to the optical axis of the objective lens requires some kind of pattern recognition means in order to recognize a volume of interest within the lateral image. Alternatively, determination of a volume of interest can be obtained by means of interaction with an operator specifying a volume of interest within a visualized lateral image.

According to a further preferred embodiment of the invention, the correction unit is adapted to correct chromatic and monochromatic aberrations of the objective lens. In particular by making use of the inventive calibration procedure, the correction unit makes use of a correction table that is specific for deviations between spectroscopic signals obtained from various lateral positions with a reference signal. In this way, all types of aberrations whether chromatic or monochromatic that occur due to non-paraxial propagation of the excitation beam and/or the return radiation can be in principle effectively compensated.

According to a further preferred embodiment of the invention, the correction unit is further adapted to correct aberrations of the objective lens on the basis of an attribute table. The attribute table is generated upon manufacturing of the objective lens and is indicative of aberrations of each specific objective lens. In contrast to the correction table, the attribute table is only specific for the objective lens but not for the entire optical arrangement of the probe head. Moreover, the attribute table generally specifies aberrations and imperfections of the objective lens that can be exploited for a universal correction of aberrations of the objective lens, when the objective lens is for example implemented into different kinds of spectroscopic systems. Hence, the attribute table is not only specific of aberrations of an objective lens in a particular optical arrangement but it is specific for the various kinds of optical aberrations of the objective lens in general.

Since the attribute table is directly generated after a manufacturing process of the objective lens, the attribute table is specific for each individual objective lens. This allows to characterize and to compensate for variations in quality of a low cost optical lens. In this way the correction procedure to be performed by the correction unit of the inventive spectroscopic system can be individually adapted for a plurality of various objective lenses. Moreover, when for example due to hygienic reasons, parts of the probe head are implemented as disposable elements, an objective lens can even be substituted by another objective lens and the correction unit can precisely be adapted for the substitute lens by making use of its corresponding attribute table. Hence a new calibration for determining the aberrations of the substitute lens does not have to be performed.

In another aspect, the invention provides a computer program product for a spectroscopic system for determining of a property of a biological structure in a volume of interest of a person. The spectroscopic system has an objective lens for directing an excitation beam into the volume of interest and for collecting return radiation from the volume of interest. The spectroscopic system further has a detector for detecting return radiation from the volume of interest and the computer program product comprises computer program means for analyzing the return radiation and for performing a correction of the return radiation for correcting aberrations of the objective lens.

In still another aspect, the invention provides a method for performing an aberration correction of an objective lens of a spectroscopic system that is designed for determining of a property of a biological structure in a volume of interest of a person. The method for performing an aberration correction comprises the steps of directing an excitation beam into the volume of interest and collecting return radiation from the volume of interest by making use of the objective lens. In a second step, the return radiation emanating from the volume of interest is detected and in a final step a correction procedure is performed on the detected return radiation for correcting aberrations introduced by the objective lens.

It is to be noted, that the present invention is not restricted to a particular type of Raman spectroscopy but that other optical spectroscopic techniques can also be used. This includes (i) other methods based on Raman scattering including stimulated Raman spectroscopy and coherent anti-Stokes Raman spectroscopy (CARS), (ii) infra-red spectroscopy, in particular infra-red absorption spectroscopy, Fourier transform infra-red (FTIR) spectroscopy and near infra-red (NIR) diffusive reflection spectroscopy, (iii) other scattering spectroscopy techniques, in particular fluorescence spectroscopy, multi-photon fluorescence spectroscopy and reflectance spectroscopy, and (iv) other spectroscopic techniques such as photo-acoustic spectroscopy, polarimetry and pump-probe spectroscopy. Preferred spectroscopic techniques for application to the present invention are Raman spectroscopy and fluorescence spectroscopy.

In the following preferred embodiments of the invention will be described in greater detail by making reference to the drawings in which.

Figure 1:
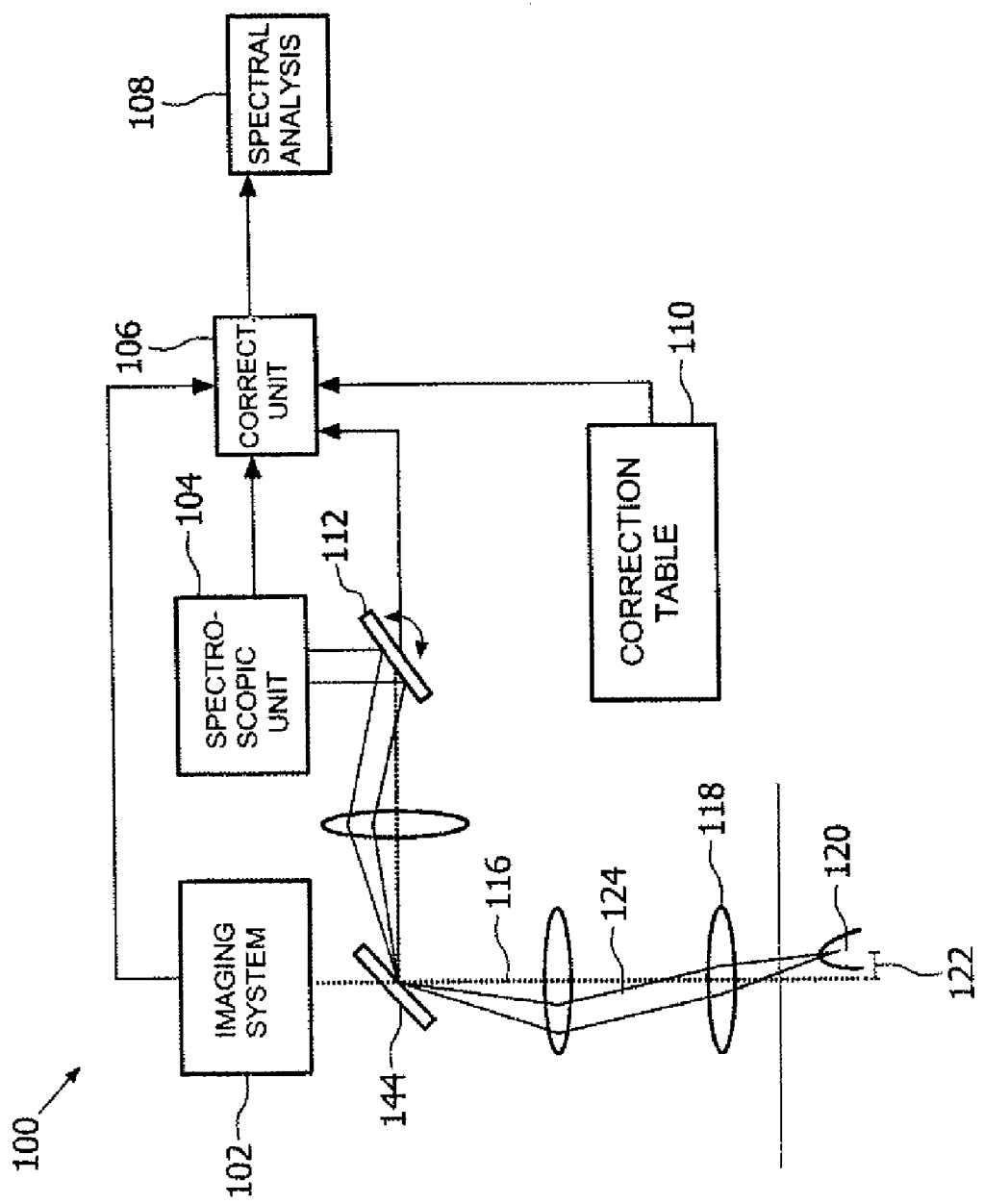
FIG. 1 is illustrative of a block diagram of the spectroscopic system.

FIG. 1 illustrates a block diagram of an inventive spectroscopic system 100. The spectroscopic system 100 has an imaging system 102. The spectroscopic system 100 has spectroscopic unit 104 that has a light source, typically a laser light source operating in the near-infrared range (NIR) and has further a detector that is typically implemented as a spectrometer. The spectroscopic system has a correction unit 106, a spectral analysis system 108 and a correction table 110. Furthermore, the spectroscopic system 100 has an optical arrangement with at least a couple of lenses, an objective lens 118, a dichroic mirror 114 and a rotatable mirror 112. The light source, e.g. the NIR laser, is implemented in the spectroscopic module 104 and is therefore not explicitly shown here.

The block diagram illustrates the optical path of the return radiation 124 emanating from the volume of interest 120. Typically, the excitation beam propagates along the same optical path as the return radiation but in opposite direction. In this way, the functionality of the objective lens becomes twofold. First, it serves to focus the excitation beam into the volume of interest and second it provides collection of return radiation from the volume of interest. For example, the excitation beam can be coupled into the optical path of the return radiation by means of dichroic beam splitters.

For the present invention it is not strictly required, that the excitation beam and the return radiation propagate along the same optical path. In principle, the excitation beam can be focused into the volume of interest by any appropriate focusing means.

The return radiation 124 propagates in a non-paraxial way through the system of lenses and mirrors before it enters the detector of the spectroscopic unit 104. In the embodiment illustrated in FIG. 1, the volume of interest 120 is laterally separated from the optical axis 116 of the imaging system 102 and the objective lens 118. This lateral distance 122 can sufficiently be controlled by the rotatable mirror 112. In other words, the orientation of the rotatable mirror 112 specifies the lateral distance 122 of the volume of interest 120 from the optical axis 116. Since the aberrations introduced by the low cost objective lens 118 strongly depend on the lateral distance 122, information of the lateral distance must be provided to the correction unit 106.

By means of tilting the rotatable mirror 112, as indicated by the arrows, the confocal measurement volume of the spectroscopic system 100 can be effectively directed into the volume of interest 120. The spectroscopic signals emanating from the volume of interest 120 are reflected by the dichroic mirror 114 and are finally detected by the detector of the spectroscopic unit 104 generating a corresponding detection signal. On the one hand, this detection signal is indicative of the spectrum of the composition of the volume of interest 120 and on the other hand this signal is indicative of the aberrations introduced by the objective lens 118. The detection signal is transmitted from the spectroscopic unit 104 to the correction unit 106.

The correction unit 106 is adapted to process the obtained detection signal in order to compensate aberrations that are introduced by the objective lens 118. Preferably, the correction unit 106 makes effective use of the correction table 110. The correction table 110 which is preferably implemented as look-up table provides correction signals that are specific for a lateral distance 122 of the volume of interest 120 from the optical axis 116. In order to apply an appropriate correction value of the correction table 110, the correction unit 106 also requires information being indicative of the lateral distance 122.

The lateral distance 122 can either be determined from the orientation of the rotatable mirror 112 or by examination of an image obtained by the imaging system 102. Therefore, the imaging system 102 as well as the rotatable mirror 112 are both connected to the correction unit 106. In this way the required information of the lateral distance 102 can be derived from orientation of the rotatable mirror 112 by simply transmitting a steering signal from the rotatable mirror 112 to the correction unit 106. Additionally or alternatively, the lateral distance 122 of the volume of interest 120 can be sufficiently obtained by analyzing a visual image that is obtained by means of the imaging system 102.

Typically, the position of the volume of interest is determined by the imaging system. If this position and hence the distance to the optical axis is known, the control unit sends a signal to the rotatable mirror to aim the measurement volume at the target volume. The focal spot of the excitation beam and hence the measurement volume are shifted in order to substantially overlap with the volume of interest 120.

Making use of the imaging system 102 further allows an intuitive selection of a volume of interest 120 within a visualized image provided by the imaging system 102. Selection of the volume of interest 120 can either be performed by pattern recognition means implemented into the inventive spectroscopic system 100 or by interaction with an operator. However, the imaging system 102 is sufficiently calibrated in order to precisely determine the lateral distance 122 of the volume of interest 120 from the optical axis 116 of the spectroscopic system. The dichroic mirror 114 serves to spatially separate the frequency shifted spectroscopic signals from the imaging signal.

After the correction unit 106 has performed an aberration compensation of the obtained detection signals by making use of the correction table 110 and information of the lateral distance 122, the aberration compensated spectrum is further transmitted to the spectral analysis unit 108 for spectral analysis of the acquired spectroscopic data. Once a spectroscopic analysis has been performed by the spectrometer 108, reliable information of the composition of the measurement volume, e.g. blood flowing through the volume of interest 120 is obtained.

The illustrated spectroscopic system 100 can be divided into a base station and a flexible and compact probe head. Preferably, only the optical components 112, 114, 118 have to be implemented into the flexible probe head. All other components like spectroscopic unit 104, imaging system 102, correction unit 106 as well as the spectrometer 108 can sufficiently be implemented into the base station. In such a case, the transmittance of optical and/or electrical signals between the base station and the probe head must be provided by means of an optical fiber and/or electrical conducting elements. Preferably, a near infrared laser for generating the excitation beam is also implemented into the base station.

The excitation beam is focused into the volume of interest 120 in the same way as the return radiation is collected from the volume of interest by making use of the rotatable mirror 112. In this way, excitation of the volume of interest as well as acquisition of corresponding spectroscopic data can be realized by the same optical means. This allows for a compact, inexpensive and flexible design of the probe head of the spectroscopic system 100.

Figure 2:
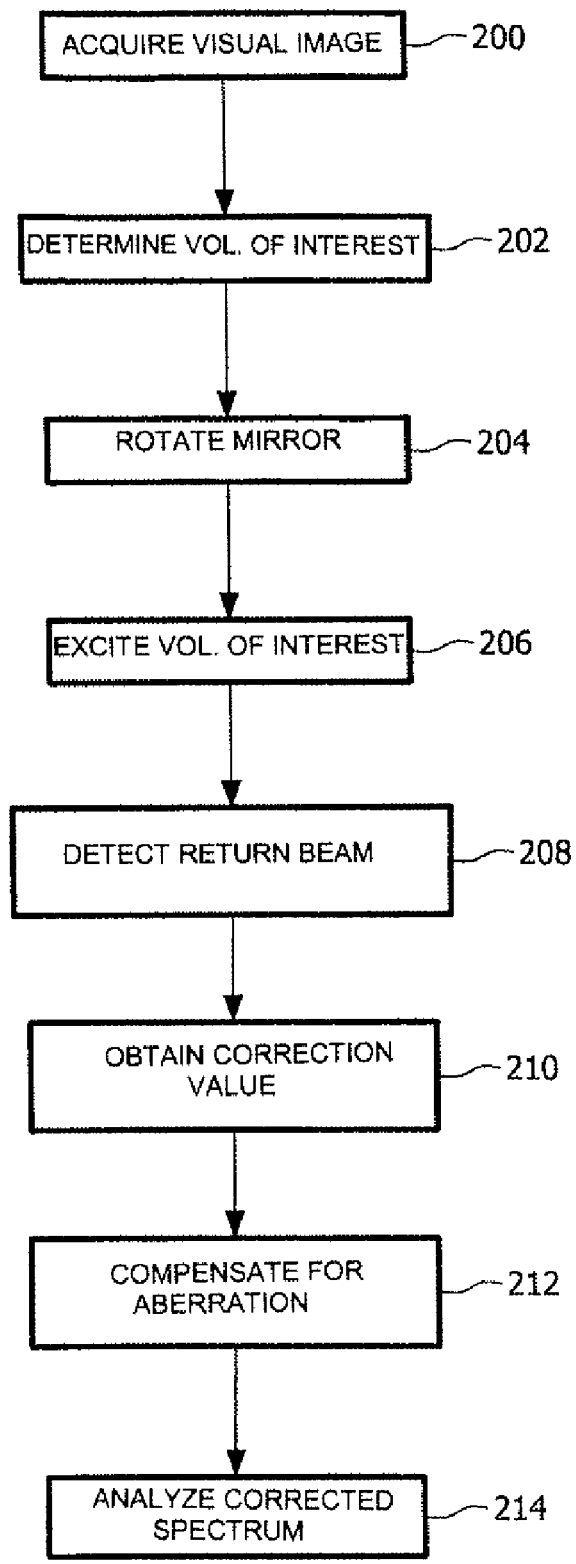
FIG. 2 illustrates a flow chart for performing an aberration correction procedure.

FIG. 2 illustrates a flow chart for performing the inventive aberration correction procedure. Here, in a first step 200 a visual image of a region of interest, e.g. a region of the surface of the skin or a region underneath the surface of the skin of a person is acquired by making use of the imaging system 102. Thereafter, in step 202 a volume of interest 120 is determined either by pattern recognition means of the imaging system 102 or by interaction with an operator. Once the volume of interest has been determined within the acquired image, the excitation beam of the spectroscopic system has to be directed and focused into the volume of interest 120.

Assuming that excitation of the volume of interest as well as optical acquisition of spectroscopic data is based on the same optical means, in step 204 the rotatable mirror 112 is rotated by an angle α in order to laterally shift the confocal measurement volume of the spectroscopic system to the volume of interest 120.

Once the focal spot of the excitation beam as well as the confocal detection volume of the optical arrangement substantially overlap with the volume of interest 120, in step 206, the volume of interest is excited by the excitation beam in order to invoke the scattering processes needed for generating of the spectroscopic data.

During exposure of the volume of interest 120 with the excitation beam in step 208 corresponding return radiation is detected from the volume of interest. The return radiation is indicative of the spectroscopic data and is detected by the spectroscopic unit 104. The detected return radiation is indicative of the spectrum and the aberrations introduced by the low costs objective lens 118.

Since the aberrations strongly depend on the lateral position of the volume of interest with respect to the optical axis of the objective lens, a correction value is obtained from the correction table in step 210 and provided to the correction unit 106. The correction value is specific for the lateral distance of the volume of interest 120 and the wavelength of the return radiation. The lateral distance of the volume of interest can in turn be determined by means of the angle α of the rotatable mirror 112. Once the correct correction value has been obtained by the correction unit 106, a corresponding correction procedure is performed on the detected return radiation, i.e. the electrical signal obtained from the spectroscopic unit 104 is subject to a corresponding aberration compensation in step 212.

Finally, in the last step 214, the aberration compensated spectrum, hence the corrected signal that is indicative of the corrected spectrum is spectrally analyzed by the spectral analysis system 108 in order to obtain precise information of the composition of the volume of interest 120.

Figure 3:
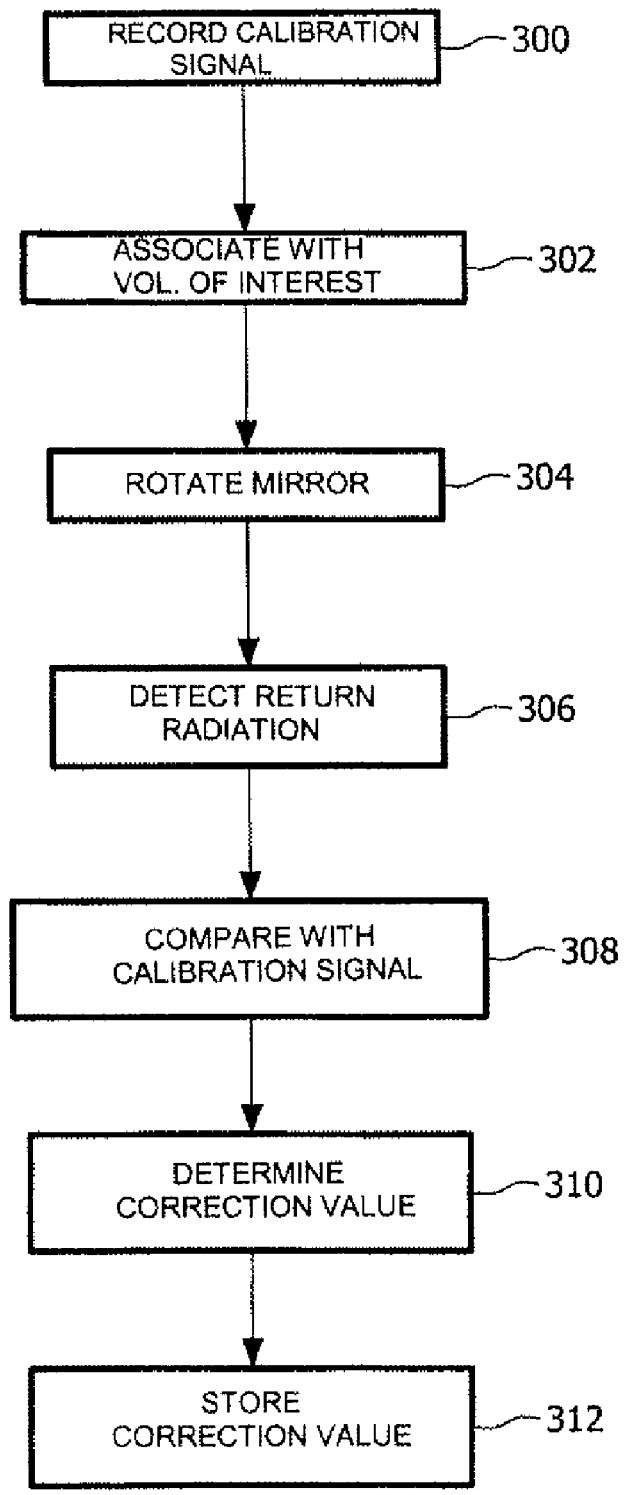
FIG. 3 shows a flow chart for generating a correction table for the inventive correction procedure.

FIG. 3 illustrates a flow chart for generating a correction table to be used by the correction unit 106 of the inventive spectroscopic system 100. In a first step 300 a calibration or reference signal is recorded. In this context a calibration or reference signal refers to detected spectroscopic data of a volume of interest that is located on the optical axis of the objective lens 118. It is assumed that the aberrations of the objective lens 118 are minimal in such a configuration and can thus be neglected.

In the next step 302, the skin or a calibration sample with an associated volume of interest 120 are successively translated in the lateral plane with respect to the optical axis 116 of the objective lens 118. In the following step 304, the rotatable mirror 112 is rotated by an angle α in such a way that the confocal measurement volume of the objective lens 118 tracks the volume of interest 120. In this way, it is guaranteed that the confocal measurement volume of the spectroscopic system remains inside the volume of interest 120.

In the successive step 306 for each lateral position of the volume of interest 120 return radiation is detected by the spectroscopic unit 104. This return radiation, i.e. the spectroscopic signal, is subject to aberrations of the objective lens 118 due to non-parallel or non-paraxial propagation of the optical signals. In the following step 308 each detected signal is compared with the calibration signal in order to resolve the aberrations that are specific for each lateral position of the volume of interest 120. Due to the comparison performed in step 308, a corresponding correction value is determined in the following step 310. The correction value can either be of scalar nature, a vector or even a multi-dimensional matrix.

Once in step 310 a correction value for a specific lateral position of the volume of interest has been determined, the correction value is stored in a correction table in the last step 312. The correction table provides assignment between the tilt angle α of the mirror 112 and the corresponding correction values. It is to be mentioned, that the lateral translation of the skin with respect to the objective is a two dimensional translation. In other words the skin and hence the volume of interest 120 can be shifted within the plane being substantially perpendicular to the optical axis 116 of the spectroscopic system.

The present application has been described with reference to the preferred embodiments. Modifications and alterations may occur to others upon reading and understanding the preceding detailed description. It is intended that the present application be constructed as including all such modifications and alterations insofar as they come within the scope of the appended claims or the equivalents thereof.

LIST OF REFERENCE NUMERALS:

| | |
|---|---|
| 100 | spectroscopic system |
| 102 | imaging system |
| 104 | spectroscopic unit |
| 106 | correction unit |
| 108 | spectral analysis unit |
| 110 | correction table |
| 112 | rotatable mirror |
| 114 | dichroic mirror |
| 116 | optical axis |
| 118 | objective lens |
| 120 | volume of interest |
| 122 | lateral distance from optical axis |
| 124 | return radiation |

The invention claimed is:

1. A spectroscopic system for determining of a property of a biological structure in a volume of interest, comprising:
   an objective lens which directs an excitation beam into the volume of interest and collects return radiation from the volume of interest,
   a detector which directs return radiation from the volume of interest and generates electrical spectroscopic signals,
   a correction unit which electronically corrects the spectroscpoic signals to correct for aberrations of the objective lens.

2. The spectroscopic system according to claim 1, further comprising:
   a rotatable mirror element for positioning of a measurement volume of the objective lens into the volume of interest, the rotatable mirror element being adapted to laterally shift the measurement volume with respect to an optical axis of the objective lens.

3. The spectroscopic system according to claim 1, further comprising:
   an imaging system providing an image of a region of interest for determining the lateral position of the volume of interest.

4. The spectroscopic system according to claim 1, wherein the correction unit corrects chromatic and monochromatic aberrations of the objective lens.

5. A spectroscopic system for determining of a property of a biological structure in a volume of interest, comprising:
   an objective lens for directing an examination beam into the volume of interest and for collectin return radiation from the volume of interest,
   a detector for detecting return radiation from the volume of interest,
   a correction unit for correction aberrations of the objective lens, which correction unit uses correction values provided by a table.

6. The spectroscopic system according to claim 5, wherein the the table includes an attribute table, the attribute table being generated upon manufacturing of the objective lens, and being indicative of aberrations of each specific objective lens.

7. The spectroscopic system according to claim 5, wherein the table includes a correction table, each correction value being specific for a lateral distance from the volume of interest to an optical axis of the objective lens.

8. The spectroscopic system according to claim 5, further comprising:
   a rotatable mirror element for positioning of a measurement volume of the objective lens into the volume of interest, the rotatable mirror element being configured to shift the measurement volume with respect to an optical axis of the objective lens; and
   wherein the table includes values based on the shift of the measurement volume with respect to the optical axis.

9. The spectroscopic system according to claim 7, wherein the lateral distance from the volume of interest to the optical axis of the objective lens is determinable by the orientation of rotatable mirror element.

10. A computer program product for a spectroscopic system for determining of a property of a biological structure in a volume of interest, the spectroscopic system having an objective lens for directing an excitation beam into the volume of interest and for collecting return radiation from the volume of interest, the spectroscopic system having further a detector for detecting return radiation from the volume of interest, the computer program product comprising computer program means for:

analyzing the return radiation, performing a correction of the return radiation for correcting aberrations of the objective lens.

11. The computer program product according to claim 10, further comprising program means to control a rotatable mirror element for positioning of a measurement volume of the objective lens into the volume of interest, the rotatable mirror element being adapted to laterally shift the measurement volume with respect to the optical axis of the objective lens.

12. The computer program product according to claim 10, further comprising computer program means to analyze an image of a region of interest provided by an imaging system for determining the lateral position of the volume of interest with respect to the optical axis of the objective lens.

13. The computer program product according to claim 10, further comprising computer program means to correct aberrations of the objective lens on the basis of an attribute table, the attribute table being generated upon manufacturing of the objective lens, and being indicative of aberrations of each specific objective lens.

14. A method for performing an aberration correction of an objective lens of a spectroscopic system being designed for determining of a property of a biological structure in a volume of interest, the method for performing an aberration correction comprising the steps of:

directing an excitation beam into the volume of interest and collecting return radiation from the volume of interest by using the objective lens, detecting return radiation from the volume of interest, determining the lateral distance between the volume of interest and an optical axis of the objective lens, obtaining a correction value being specific for the determined lateral distance, applying a correction procedure on the detected return radiation by making use of the obtained correction value.

* * * * *